United States Patent [19]

Gabriele

[11] Patent Number: 4,477,215

[45] Date of Patent: Oct. 16, 1984

[54] BROACHING MACHINE SAFETY

[76] Inventor: Leonard A. Gabriele, 24271 Bolam, Warren, Mich. 48089

[21] Appl. No.: 321,574

[22] Filed: Nov. 16, 1981

[51] Int. Cl.³ .................................................. B23D 41/08
[52] U.S. Cl. ..................................... 409/245; 409/255
[58] Field of Search .............. 409/254, 255, 245, 134, 409/264, 280; 83/62, 62.1; 408/6

[56] References Cited

U.S. PATENT DOCUMENTS 2,809,541 10/1957 Witt ..................................... 83/62 X
2,818,001 12/1957 Chayka ............................. 409/245
4,205,567 6/1980 Hirata et al. ........................... 83/62

OTHER PUBLICATIONS

IBM Tech. Discl. Bulletin, vol. 25, No. 1, Jun. 1922, p. 291, Broken (Missing) Drill Detection, T. E. Wray.

Primary Examiner—William R. Briggs

[57] ABSTRACT

An automatic machine tool having a tool holder for moving a plurality of tools into working relation to a plurality of work parts, and mechanically actuated means effective to terminate machine operation if any one tool is missing from the tool holder.

11 Claims, 8 Drawing Figures

BROACHING MACHINE SAFETY

BRIEF SUMMARY OF THE INVENTION

The present invention relates to automatic machine tools for performing identical machining operations on a series of groups of work parts, and more particularly to safety equipment to terminate automatic operation in the event of failure occurring in operation on one of the parts in a group.

For illustration the operation chosen is in the broaching of six annular parts simultaneously, and more specifically in an operation in which the six vertically disposed broaches are suspended by a vertically movable retriever and moved downwardly to cause the lower ends of the broaches to pass through the openings in parts supported on a table into interlocked engagement with a broach puller. The retriever releases the broaches, and the puller pulls the broaches completely through the parts, which are then removed.

At this time the broach puller moves upwardly to position the top ends of the broaches above the table, and the retriever moves down and is latched to the top ends of all broaches. The retriever is then raised to position the bottom ends of the broaches above the table. Six new work parts are now positioned on the table beneath the broaches, and the retriever is lowered to cause the bottom ends of the broaches to pass through the holes in the parts and to interlock with the puller.

This automatic operation continues as long as a supply of parts to be broached is available.

As is conventional practice in automatic machines, sensing means are provided to monitor the operation, which control the proper sequencing, usually by the appropriate actuation of limit switches which control valves which in turn control the operation of hydraulic devices. Thus for example, the broach puller is connected to a hydraulic device which moves it vertically in proper sequence to the other operations. Similarly, the retriever is connected to a hydraulic device which relates its vertical movement to other operations. These other operations, in a fully automatic broaching machine comprise advancing the work parts to operating position and clearing finished parts from the support table.

In order to simplify the present disclosure and to focus it onto the specific advance in the art which the present invention represents, no effort is made to illustrate details of the machine tool which may be considered conventional. Similarly, no disclosure is made of the electrical circuitry, except that two limit switches are shown which when actuated, terminate the automatic cycling of the machine.

In order to protect against the possibility of misplaced parts, or parts with undersize holes, each latch on the retriever is provided individually with means actuated by failure of one or more of the broaches to pass through the work part hole, and this operates a limit switch which when tripped terminates the automatic cycling of the machine. This sensing of work parts with undersize holes, or the like, is conventional in the art and broadly forms no part of the present invention. However, the mechanism for terminating automatic machine operation in the event of failure at another step in the cycle is combined in a novel manner with the first mentioned sensing means, as will later appear.

Assuming that all work parts are properly sized and properly positioned, following removal of the finished work parts, the broaches are latched to the retriever, which elevates the broaches to a clearance position to permit automatic location of a new group of work parts in broaching position.

It has been found that occasionally a broach is not elevated by the retriever, or becomes disengaged and falls therefrom as the retriever is elevated. If this happens, further automatic cycling of the machine would break the broach or cause other damage.

In accordance with the present invention, each latching device on the retriever is provided with its own individual device for sensing the presence or absence of a broach thereat. Means are associated with each of these six sensing devices which are effective, if any one of the six latches on the retriever does not retain a broach thereat, to terminate automatic cycling of the machine.

This sensing means is mechanical and is mechanically associated with a single limit switch. In general terms, it provides a spring biased switch operator, operable by its own spring (herein referred to as the switch spring) to position the operator to continue the cycling of the machine. Each latch of the retriever has its own individual latch spring connected to oppose the action of the switch spring, and each latch spring is effective alone to overcome the switch spring. Each of the latch springs is disabled if its associated latch holds a broach, but if any one of the latches does not hold a broach, the associated latch spring overcomes the switch spring.

More specifically the foregoing is accomplished by providing a single pivoted switch-operating arm spring biased to the position in which machine operation is continued. A plurality of actuating arms are independently movable into effective engagement with the operating arm and are independently spring-biased so that any one of the actuating arms is effective when free to move the operating arm to operation-terminating position. Means responsive to the presence of a broach properly latched to each holder is effective to retain the associated actuating arm against the bias of its individual spring to prevent actuation of the operating arm thereby.

DETAILED DESCRIPTION

Figure 8:
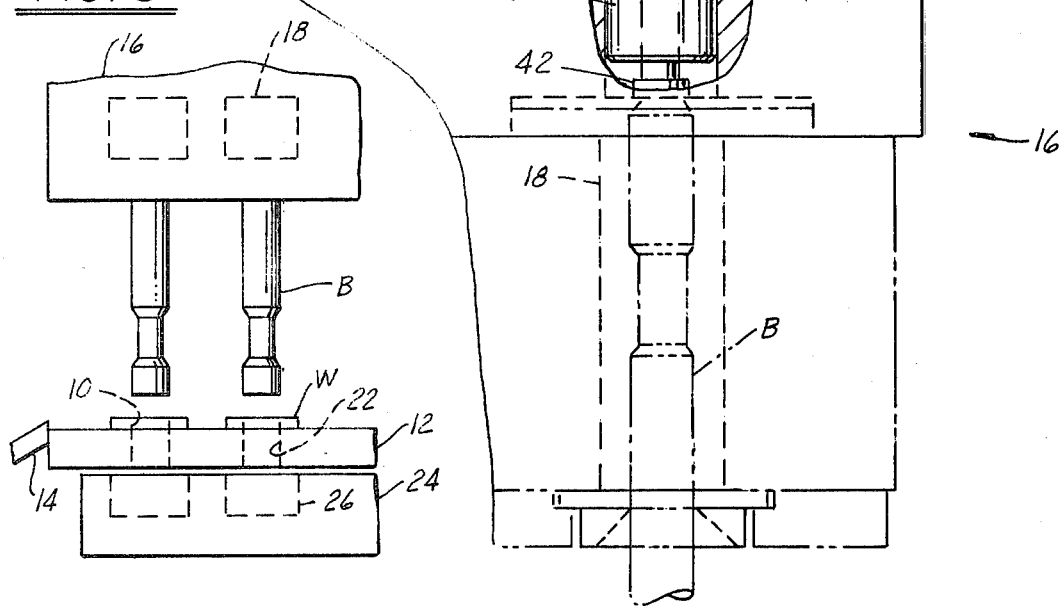
FIG. 8 is a diagrammatic showing of a vertical, pull-down broaching machine.

Before proceeding to detailed structure seen in FIGS. 1-6, reference is made to the simplified diagram of FIG. 8. In this figure there are shown two work parts W, which may be annular and have central holes or openings 10, to be machined by broaching. In the specific machine disclosed herein, six stations are provided for broaching six work parts simultaneously.

Parts W are supported on the upper surface of a table 12, and it will be understood that the parts will be advanced thereto and located thereon by suitable conventional mechanism, automatically operated and properly sequenced as well understood in the art. After being broached, the finished parts are ejected, as for example by a pusher which pushes them to the left into an inclined outchute 14.

Above the table a retriever slide 16 is vertically movable and contains a plurality of latches 18 which latch with the top ends of broaches B so as to draw them upwardly into clearance position with respect to table 12, after which a new group of unfinished work parts is properly located in alignment with the broaches. Latches 18 are yieldable upwardly relative to the retriever to indicate failure of a broach to pass through the hole in a work part.

Table 12 is provided with openings 22 through which the bottom ends of the broaches pass. A broach puller 24 is vertically movable on the machine frame and is ordinarily moved downwardly in a broach-pulling stroke by a hydraulic piston and cylinder device (not shown) and returned to upper position for engagement with broaches B. Puller 24 is provided with individual locks indicated diagrammatically at 26. Locks 26 are designed to interlock solidly with the bottom ends of the broaches to pull them downwardly against the resistance offered as a result of removal of material from parts W. Latches 18 of course have only to support the weight of the individual broaches.

It will be understood that the steps of the automatic machine cycle are monitored by sensing devices which sense completion of the steps of the process and initiate the next succeeding step. The present invention is concerned only with a sensing device which senses absence of a broach in any one of the broach latches on the retriever, and this in combination with a particular sensing device which senses failure of a broach to enter a hole in a work part as the retriever moves downwardly to move the broaches into locking engagement with the puller.

Referring now to the detailed showing of FIGS. 1–7, the mechanism which constitutes the present invention is mounted on a bar 28 of retriever slide 16 which is slidable vertically in ways provided on the frame of the broaching machine. In these figures, the parts are in the position occupied when the retriever slide is at the top of its stroke, and the several broaches B are suspended from the individual retriever latches indicated diagrammatically at 18.

The individual sensing devices associated with each broach are identical and only one will be described in detail.

Vertically slidable in a bore 29 of retriever bar 28 is an elongated outer plunger 30 having a lower head 32 which constitutes a guide and an abutment for compression spring 34, the upper end of which seats against a bushing 36 fixed in the bore 29 by set screw 26. Outer plunger 30 has an axially extending through passage 40 in which an elongated inner plunger 42 is slidable.

The outer plunger has an enlarged cap 44 at its upper end, and the inner plunger 42 has an enlarged cap 46 at its upper end.

Spring 34 biases outer plunger 30 downwardly and if the bottom end of any of the broaches B fails to pass through a work part W as the retriever 16 moves to the bottom of its stroke, the corresponding latch 18 and outer plunger 30 are moved upwardly in bore 29. Cap 44 through mechanism to be described, trips a limit switch LS 1 and terminates machine operation until the fault is corrected.

The lower end of the inner plunger has a head which is engaged by the upper end of the broach B if a broach is properly engaged by its individual latch 18. If however a broach has been dropped by the retriever, or failed to be engaged by its individual latch, inner plunger 42 is permitted to drop in bore 40 of outer plunger 30 and this movement of any one of the inner plungers, through mechanism to be described, trips limit switch LS 2 and terminates machine operation until the fault is corrected.

Mounted on top of retriever bar 28 by screws 48 are supports 50 in which are received an upper rod 52, an intermediate pivot 54 and a lower rod 56.

At each of the broach stations arms 58 are fixed to rod 56 and have rollers 60 which engage the outer plunger caps 44 outwardly of inner plungers 42. Adjacent the limit switch LS 1 the rod has a switch dog 62 (FIG. 6) which engages roller 64 on LS 1 switch arm 66. Accordingly if any one outer plunger 30 is displaced upwardly in its bore, rod 56 is rotated and switch dog 62 trips limit switch LS 1 to terminate the cycle.

Figure 5:
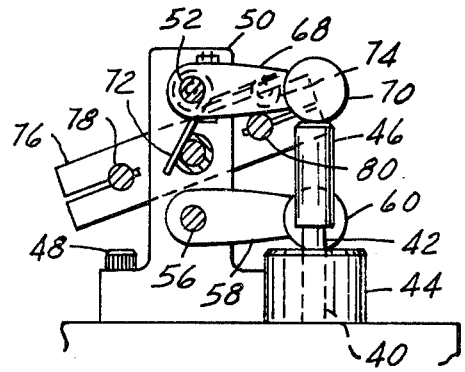
Figure 6:
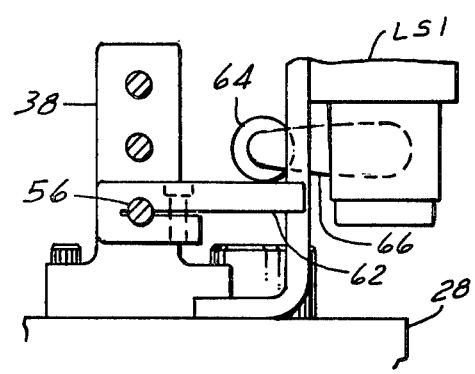
Figure 7:
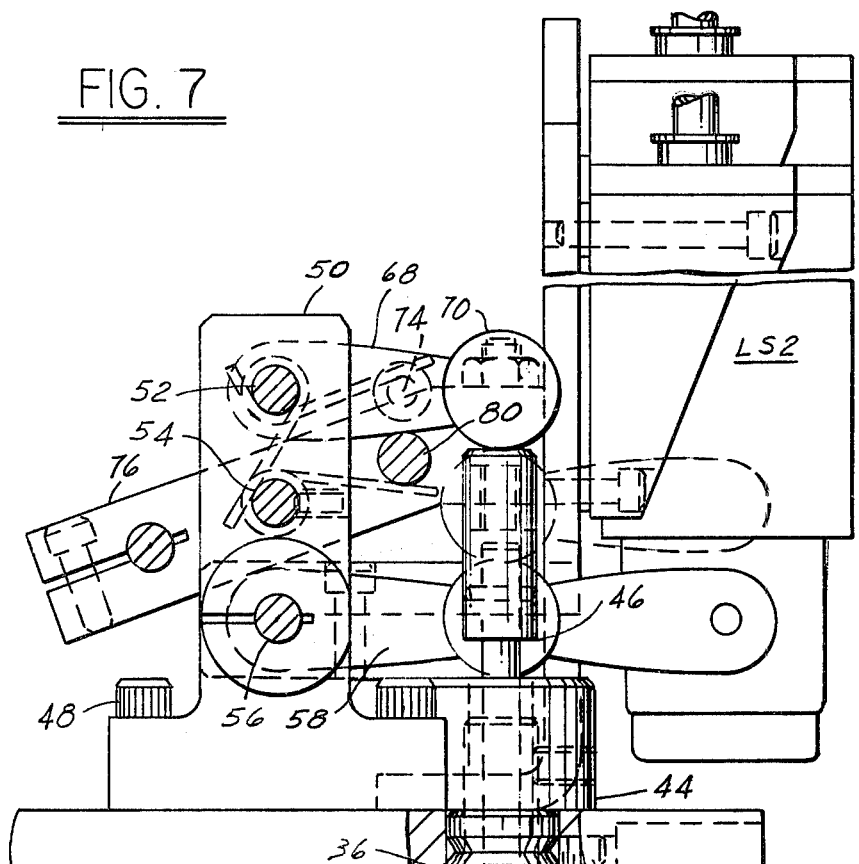
FIG. 7 is an enlargement of a portion of FIG. 3 to more clearly show details.

Independently swingable on upper rod 52 are top roller arms 68 carrying rollers 70. As best seen in FIG. 5, roller 70 engages cap 46 of inner plunger 42. Relatively strong torsion springs 72 surround rod 52, and engage rod 54 at one end, and a button 74 fixed to arm 68 at the other. Accordingly each arm 68 is independently sensitive to the absence of a broach associated therewith, and is rotated upwardly by cap 46 of inner plunger 42 if the associated broach is in proper position in the retriever.

Mounted on the middle rod 54 are a plurality of arms or tie bar clamps 76 which are interconnected by a tie bar 78 at one side of pivot bar 54, and by a trip bar 80 at the other side. The tie bar and trip bar interconnect arms 76 so that they move in unison about the axis of rod 54. In addition a trip arm 82 is carried by rod 54 and is rigidly connected to tie bar clamps 76 by tie bar 78 and trip bar 80.

Figure 1:
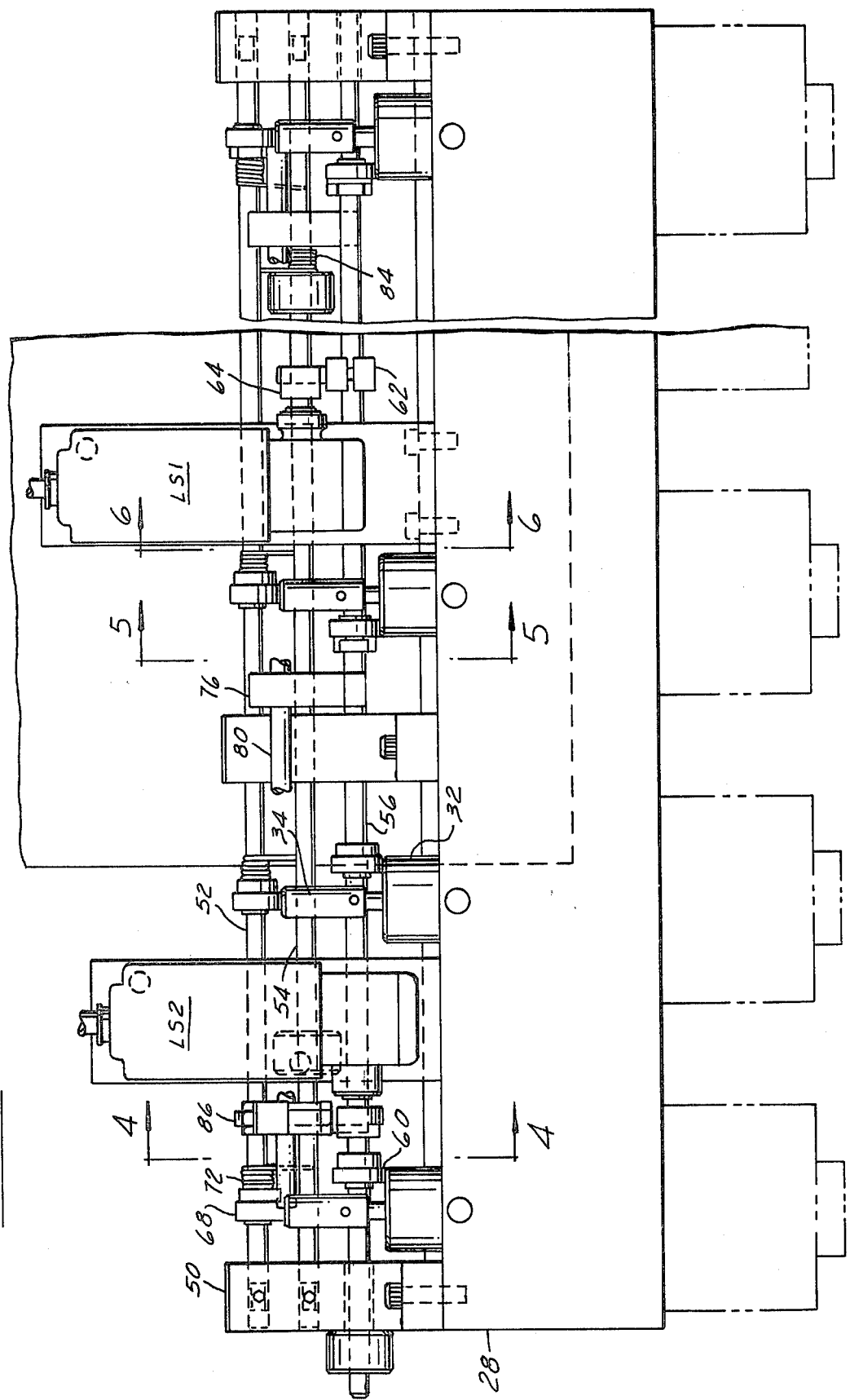
FIG. 1 is a front elevation of the retriever.
Figure 2:
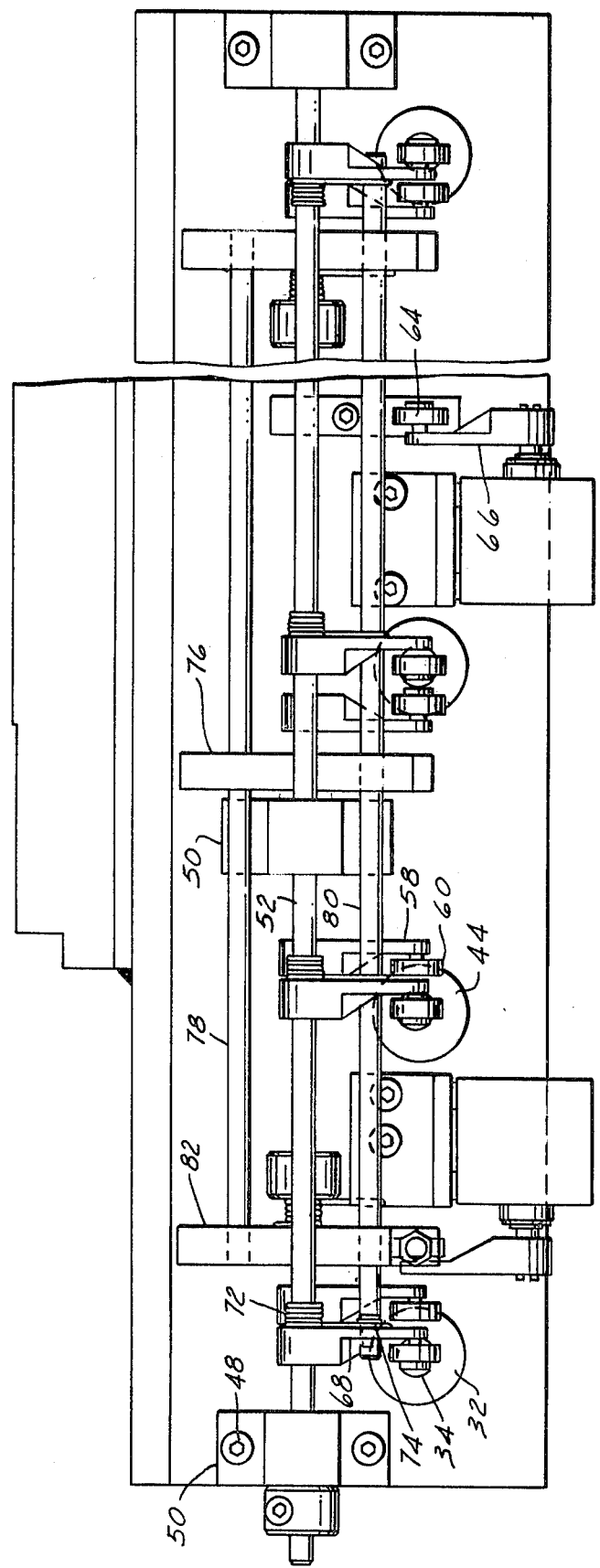
FIG. 2 is a plan view of the retriever.
Figure 3:
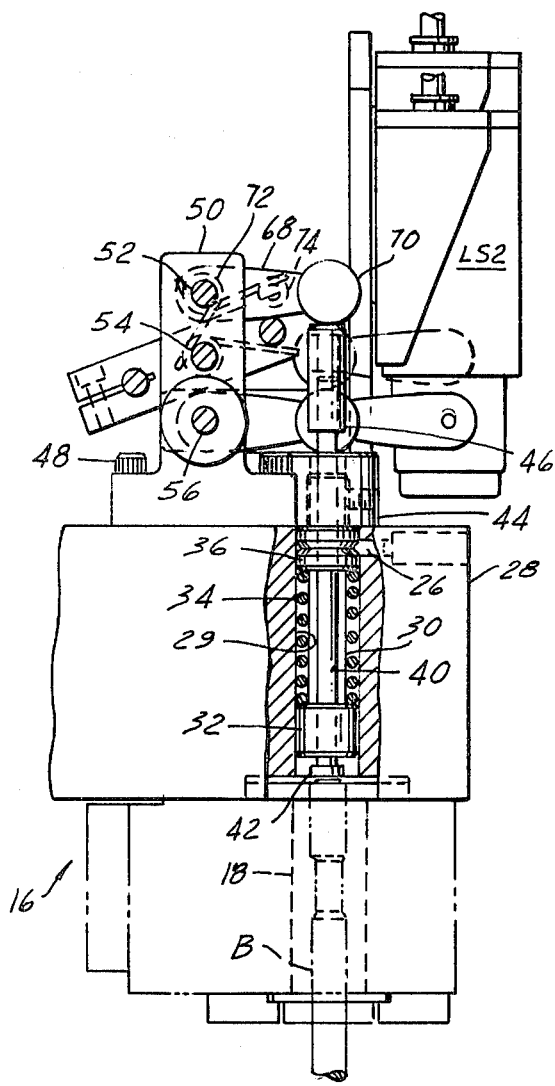
FIG. 3 is an end view as viewed from the left in FIG. 1.
Figure 4:
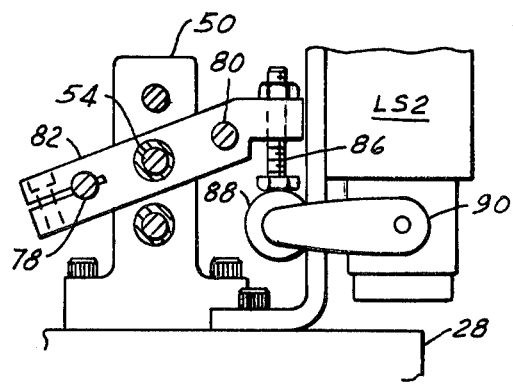
FIGS. 4-6 are fragmentary sectional views on lines 4—4 5—5, and 6—6, FIG. 1.

Middle rod 54 is biased in a counter clockwise direction as viewed in FIGS. 4 and 5, by one or more coil springs 84, (FIG. 1) but the relative strength of each of the several springs 72 is sufficient to overcome spring 84. Accordingly if any one of the arms 68 fails to be displaced upwardly by inner plunger 42, trip arm 82 remains in the "stop" position illustrated in FIG. 4.

It will be seen that each of the top roller arms 68 is engageable with trip bar 80, a condition well illustrated in FIG. 5, and the torque applied by springs 72 to arms 68 is thereby applied to tie bar clamps 76 and to trip arm 82.

Trip arm 82 has an adjustable abutment screw 86 which engages a roller 88 on arm 90 of limit switch LS 2. Accordingly, so long as broaches are all present in retriever latches 18, all inner plungers are in upper position and all top roller arms 68 are prevented from actuating the trip arm 82 to trip limit switch LS 2. However, the absence of a broach from any one retriever latch permits the associated inner plunger 42 to be displaced downward by its associated spring 72, and this transmits a torque through trip bar 80 to tie bar clamps 76 and more significantly to trip arm 82 sufficient to overcome the torque of trip arm spring 84, and thus trip limit switch LS 2 to terminate automatic cycling of the machine.

For reasons which are self evident, the positions of said trip arm 82 and the switch arm 90 illustrated in FIG. 4 are for simplicity referred to as their "run" positions, in which continued automatic cycling of the machine is permitted. It will be noted that the position of said trip arm 82 as seen in FIG. 4 is the same as that of tie bar clamps 76, which make up a pivoted framework including tie bar 78 and trip bar 80.

Each of the roller arms 68 similarly has two positions, the "run" position seen in FIG. 5, and a "stop" position in which said arms 68 are allowed to rotate clockwise under the influence of their individual bias springs 72 from the illustrated position.

Each of the roller arms 68 is independently rotatable about the axis of rod 52, and since each of the springs 72 is capable of overcoming spring means 84, the trip arm 82, together with tie bar clamps 76, tie bar 78 and trip bar 80, is moved to "stop" position when any one of the roller arms 68 is moved to its "stop" position. This of course occurs if any one broach B is missing for any reason from its latch 18 in the retriever.

I claim:

1. A broaching machine simultaneously broaching a plurality of annular work parts comprising a work support table having a plurality of broach openings therethrough, a vertically movable broach puller below said table, a vertically movable retriever above said table having a plurality of broach holders, said retriever comprising a support bar having a plurality of vertical retriever openings therethrough in vertical alignment with said holders, an outer plunger in each of said retriever openings, resilient means in each of said openings biasing said outer plunger downwardly for actuation by a broach which fails to enter a work part, an elongated rod above said support bar, a plurality of arms fixed to said rod having portions overlying said outer plunger, a first limit switch, and a first switch operating arm fixed to said rod; each of said outer plungers having a vertical through opening, an inner plunger in each of said through openings, having its lower end engageable with the upper end of a broach in its associated holder, a second elongated rod above said support bar, a plurality of independently pivotal arms carried by said second rod, first individual resilient means urging each of said arms independently downwardly into engagement with the top ends of said inner plungers, a third elongated rod parallel to said second rod, a plurality of rigidly interconnected arms pivotal as a unit about said third rod, a trip bar interconnecting all of said rigidly interconnected arms, each of said independently pivotal arms being engageable with said trip bar, a second limit switch, one of said rigidly interconnected arms being a second switch operating arm, second resilient means operatively connected to said second switch operating arm effective to move it to actuate said second switch, each of said first resilient means being effective to overcome said second resilient means if its independently pivotal arm is not engaged by the upper end of the inner plunger associated therewith.

2. Mechanism as defined in claim 1, in which the upper end of each of said outer plungers has a laterally enlarged head engageable with the top of said retriever support bar, a spring abutment bushing fixed within each of said vertical openings through said support bar, said outer plungers having enlarged heads at the bottom ends to constitute second spring abutments.

3. Mechanism as defined in claim 1, in which said inner plungers have enlarged heads at their upper ends resting on the upper ends of said outer plungers unless moved upwardly relative to said outer plunger by the upper ends of broaches in the associated holders.

4. Mechanism as defined in claim 2, in which said inner plungers have enlarged heads at their upper ends resting on the upper ends of said outer plungers unless moved upwardly relative to said outer plunger by the upper ends of broaches in the associated holders.

5. Mechanism as defined in claim 3, in which said inner plungers have enlarged heads at the bottom ends thereof engageable with the top ends of broaches in the associated holders.

6. Mechanism as defined in claim 1, comprising stationary supports fixed to the top of said retriever bar, said three elongated rods being mounted in superposed parallel relation in said supports.

7. In a multiple station vertical pull-down fully automaticaly cycled broaching machine for broaching holes in annular parts, a vertically movable retriever, a plurality of latching holders vertically movable on said retriever, a pair of sensing elements on said retriever associated with each of said holders, said elements being independently vertically movable on said retriever, a first element of each pair being engageable with the upper end of a broach in the associated holder and movable upwardly thereby if the broach is moved upwardly relative to said retriever as a result of failure of the broach to pass through the hole in the associated part, the second element of each pair being movable downwardly relative to said retriever if no broach is present in the associated holder, in which said first elements are elongated outer plungers slidable in vertical openings in said retriever and have passages extending longitudinally therethrough and said second elements are elongated inner plugers slidable in the passages in said outer plungers and means responsive to the aforesaid vertical movement of either of said elements associated with any one of said latching holders to terminate automatic cycling of said machine.

8. A machine as defined in claim 7, which comprises individual resilient means operatively connected to each of said second elements biasing them for independent movement in a direction to terminate machine operation, a single operator controlling machine operation, second resilient means biasing said operator in a direction to terminate machine operation, abutment means mechanically connecting any one of said second elements which is moved in the direction to terminate machine operation to said operator, the resilient means connected to each of said second elements being effective to overcome the resilient means connected to said operator.

9. Mechanism comprising an automatically cycling broaching machine comprising a work support for positioning a plurality of laterally aligned annular work parts, a retriever movable toward and away from said support, said retriever having a plurality of laterally aligned holders individually aligned and releasably engageable with corresponding ends of elongated broaching tools and operable to move the other ends of said tools simultaneously through the openings in the annular work parts upon movement of said retriever, a slide at the opposite side of said support from said retriever and having a laterally aligned locks selectively engageable in locked relation with the other end of the tools, means for moving the slide to force all of the tools through the work parts respectively associated therewith, control means comprising a control device having an operator operable to terminate the automatic cycling of said machine, said operator being movable between a "run" position and a "stop" position first resilient means connected to said operator urging said operator to "run" position, a plurality of aligned independently movable actuators respectively associated with said holders, and having one way engagement with said operator to move said operator and movable between a "run" position in which said actuator permits said operator to remain in "run" position, and a "stop" position in which any one of said actuators moves said operator to "stop" position, second resilient means biasing each of said actuators independently toward "stop" position, each of said second resilient means being effective to overcome the bias of said first resilient means to move said operator to "stop" position, and sensing means responsive to the presence of a tool in its holder to retain the associated acutator in "run" position.

10. Mechanism as defined in claim 9, in which said control device is a limit switch.

11. Mechanism as defined in claim 9, in which said sensing means comprises an elongated pivot rod on which all of said actuators are independently rotatable, a pivot on which said operator is rotatable, and a trip bar fixedly connected to said operator engageable by all of said actuators.

* * * * *